US009858190B2

(12) United States Patent
Ambroladze et al.

(10) Patent No.: US 9,858,190 B2
(45) Date of Patent: Jan. 2, 2018

(54) MAINTAINING ORDER WITH PARALLEL ACCESS DATA STREAMS

(71) Applicant: International Business Machines Corporation, Armonk, NY (US)

(72) Inventors: Ekaterina M. Ambroladze, Los Angeles, CA (US); Timothy C. Bronson, Round Rock, TX (US); Garrett M. Drapala, Cary, NC (US); Michael Fee, Cold Spring, NY (US); Matthias Klein, Wappingers Falls, NY (US); Pak-kin Mak, Poughkeepsie, NY (US); Robert J. Sonnelitter, III, Wappingers Falls, NY (US); Gary E. Strait, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 14/606,432

(22) Filed: Jan. 27, 2015

(65) Prior Publication Data
US 2016/0217077 A1 Jul. 28, 2016

(51) Int. Cl.
*G06F 12/08* (2016.01)
*G06F 12/0855* (2016.01)
*G06F 12/0831* (2016.01)

(52) U.S. Cl.
CPC ...... *G06F 12/0855* (2013.01); *G06F 12/0833* (2013.01); *G06F 2212/1021* (2013.01); *G06F 2212/608* (2013.01); *G06F 2212/621* (2013.01)

(58) Field of Classification Search
CPC ........ G06F 12/0815–12/0837; G06F 2212/621
USPC .................................................. 711/141–146
See application file for complete search history.

(56) References Cited

U.S. PATENT DOCUMENTS 4,370,710 A * 1/1983 Kroft .................. G06F 12/0888
711/128
4,970,643 A * 11/1990 Cramm ............... G06F 12/1063
711/3
5,623,628 A * 4/1997 Brayton ............. G06F 12/0831
710/39

(Continued)

FOREIGN PATENT DOCUMENTS

CN 102880467 A 1/2013
JP 5068552 3/1993

OTHER PUBLICATIONS

William Stallings. Computer Organization and Architecture. 2010. Prentice Hall. 8th ed. pp. 143-145, 460-461, 640-645.*

(Continued)

*Primary Examiner* — Nathan Sadler
(74) *Attorney, Agent, or Firm* — Steven F. McDaniel; David B. Woycechowsky

(57) ABSTRACT

Maintaining store order with high throughput in a distributed shared memory system. A request is received for a first ordered data store and a coherency check is initiated. A signal is sent that pipelining of a second ordered data store can be initiated. If a delay condition is encountered during the coherency check for the first ordered data store, rejection of the first ordered data store is signaled. If a delay condition is not encountered during the coherency check for the first ordered data store, a signal is sent indicating a readiness to continue pipelining of the second ordered data store.

12 Claims, 4 Drawing Sheets

(56) References Cited

U.S. PATENT DOCUMENTS

| | | | |
|---|---|---|---|
| 5,659,709 A * | 8/1997 | Quach | G06F 12/0831 711/141 |
| 5,829,010 A | 10/1998 | Cherabuddi | |
| 5,931,932 A * | 8/1999 | Kanekal | G06F 11/141 710/107 |
| 6,687,809 B2 | 2/2004 | Chowdhury et al. | |
| 8,230,177 B2 | 7/2012 | Luttrell | |
| 8,266,331 B2 | 9/2012 | Freking et al. | |
| 8,850,129 B2 | 9/2014 | Hagspiel et al. | |
| 2002/0040414 A1 | 4/2002 | Uehara et al. | |
| 2004/0024949 A1 | 2/2004 | Winkler et al. | |
| 2004/0172493 A1 | 9/2004 | Askar | |
| 2006/0184746 A1* | 8/2006 | Guthrie | G06F 12/0831 711/146 |
| 2007/0022253 A1 | 1/2007 | Cypher et al. | |
| 2007/0055828 A1 | 3/2007 | Tsien | |
| 2011/0320743 A1 | 12/2011 | Hagspiel et al. | |
| 2013/0091330 A1 | 4/2013 | Mital et al. | |
| 2013/0318308 A1 | 11/2013 | Jayasimha et al. | |
| 2014/0258620 A1* | 9/2014 | Nagarajan | G06F 12/0815 711/120 |
| 2014/0281237 A1 | 9/2014 | Loewenstein et al. | |
| 2015/0128142 A1* | 5/2015 | Fahim | G06F 9/52 718/102 |

OTHER PUBLICATIONS

White et al. IBM zEnterprise System Technical Introduction. 2010. IBM. SG24-7832-00.*

Galles et al. "Performance optimizations, implementation, and verification of SGI Challenge multiprocessor." Jan. 1994. IEEE. Proceedings of the Twenty-Seventh Hawaii International Conference on System Sciences.*

Buyya et al. High Performance Mass Storage and Parallel I/O. 2001. http://buyya.com/superstorage/chap42.pdf. pp. 617-632.*

Budruk et al. PCI Express System Architecture. 2003. Addison-Wesley. pp. 118-132.*

Jahre et al. "A High Performance Adaptive Miss Handing Architecture for Chip Multiprocessors." 2011. Springer-Verlag. Transactions on HiEAC IV. pp. 1-20.*

Andrew W. Wilson Jr. "Hierarchical Cache / Bus Architecture for Shared Memory Multiprocessors." 1987. ACM. ISCA '87. pp. 244-252.*

Dobos et al., "IBM zEnterprise System Technical Introduction", IBM Rebooks, International Technical Support Organization, Second Edition (Mar. 2014), Chapter 2, <http://w3.itso.ibm.com/abstracts/sg248050.html?Open>.

Enright Jerger et al., "Virtual Tree Coherence: Leveraging Regions and In-Network Multicast Trees for Scalable Cache Coherence", 2008, 41st IEEE/ACM International Symposium on Microarchitecture, 2008, MICRO-41, Lake Como, pp. 35-46, Nov. 8-12, 2008, DOI: 10.1109/MICRO.2008.4771777.

U.S. Appl. No. 14/533,579 entitled "Increased Bandwidth of Ordered Stores in a Non-Uniform Memory Subsystem", filed Nov. 5, 2014.

* cited by examiner

MAINTAINING ORDER WITH PARALLEL ACCESS DATA STREAMS

BACKGROUND OF THE INVENTION

Embodiments of the present invention relate generally to the field of data communication using parallel access data streams, and more particularly to parallel access data stream communication in distributed shared memory systems having variable latency.

A CPU (central processing unit) cache is a cache used by a computer CPU to reduce the average time to access data from main memory. A cache is memory, smaller and faster than main memory, which stores copies of data from frequently used main memory locations. A cache is often organized as a hierarchy of cache levels such as L1 (level 1), L2, L3 and so on. When the CPU needs to access a location in main memory, it first checks whether a copy of that data is in the cache. If so, the processor reads from or writes to the cache, which is faster than reading from or writing to main memory.

Each cache holding data associated with a location in main memory presents a potential data coherency problem. For example, the relevant data in main memory may be changed by other entities (for example, by peripherals using DMA (direct memory access) or by any of the various cores in a multi-core processor), in which case the copy in the cache(s) may become stale (out-of-date). Alternatively, when a CPU in a multiprocessor system updates data in its cache, copies of that data in caches associated with other CPUs become stale.

SUMMARY

According to an aspect of the present invention, a method for use with a distributed shared memory system including a first memory node having at least a first cache level that performs the following steps (not necessarily in the following order, and it is noted that operations may overlap in time): (i) performing, by the first memory node, a coherency check on a first ordered data store for a first ordered data store request received from an input controller; (ii) signaling, by the first memory node and to the input controller, that the first memory node is ready to begin pipelining of a second ordered data store into the first memory node; (iii) detecting, by the first memory node, whether a delay condition exists in the distributed shared memory system with respect to the coherency check of the first ordered data store; (iv) responsive to detection of the delay condition, sending, by the first memory node and to the input controller, a rejection signal indicating that the distributed shared memory system will not complete the first ordered data store; and (v) responsive to detection of an absence of the delay condition, sending, by the first memory node and to the input controller, a ready signal indicating that the first memory node is ready to continue pipelining of the second ordered data store into the first memory node.

According to a further aspect of the present invention, a computer chip for use in a distributed shared memory system including a first memory node having at least a first cache level, the computer chip included in the first memory node and structured, connected, located and/or programmed to (not necessarily in the following order, and it is noted that operations may overlap in time): (i) initiate a coherency check on a first ordered data store for a first ordered data store request received from an input controller; (ii) signal to the input controller that the first memory node is ready to begin pipelining of a second ordered data store into the first memory node; (iii) detect whether a delay condition exists in the distributed shared memory system with respect to the coherency check of the first ordered data store; (iv) responsive to detection of the delay condition, send to the input controller a rejection signal indicating that the distributed shared memory system will not complete the first ordered data store; and (v) responsive to detection of an absence of the delay condition, send to the input controller a ready signal indicating that the first memory node is ready to continue pipelining of the second ordered data store into the first memory node.

According to a further aspect of the present invention, a portion of a distributed shared memory computer system, the portion comprising a first memory node having at least a first cache level and a computer chip and the computer chip structured, located, connected and/or programmed to (not necessarily in the following order, and it is noted that operations may overlap in time): (i) initiate a coherency check on a first ordered data store for a first ordered data store request received from an input controller; (ii) signal to the input controller that the first memory node is ready to begin pipelining of a second ordered data store into the first memory node; (iii) detect whether a delay condition exists in the distributed shared memory system with respect to the coherency check of the first ordered data store; (iv) responsive to detection of the delay condition, send to the input controller a rejection signal indicating that the distributed shared memory system will not complete the first ordered data store; and (v) responsive to detection of an absence of the delay condition, send to the input controller a ready signal indicating that the first memory node is ready to continue pipelining of the second ordered data store into the first memory node.

DETAILED DESCRIPTION

Figure 1:
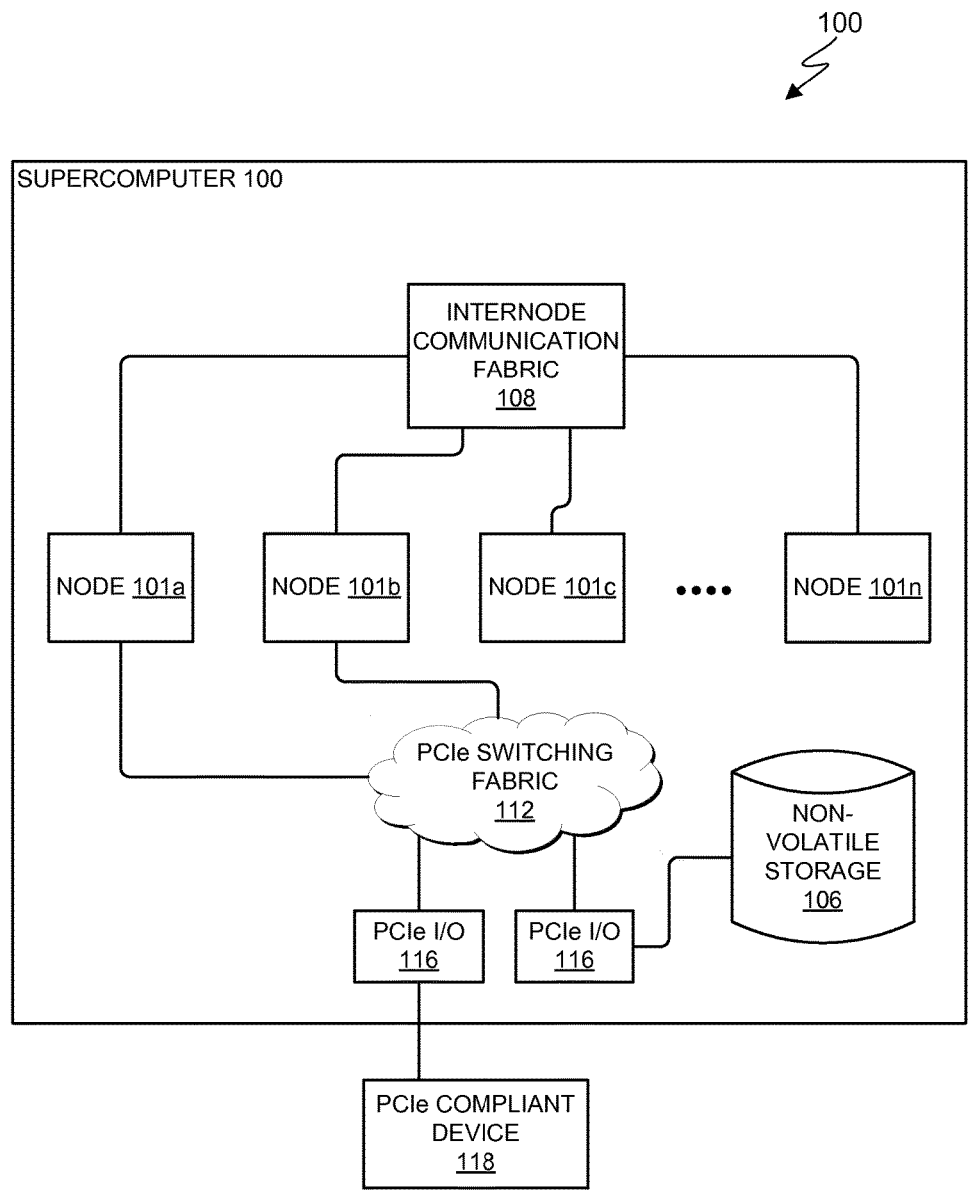
FIG. 1 is a block diagram of a first embodiment system according to the present invention.

Some embodiments of the present invention provide a high degree of parallelization and/or throughput for one or more streams of store requests while maintaining store order for each stream in a distributed shared memory system. Processing of a new store request of an ordered stream can begin as soon as local resources are secured for the previous store request of the stream, regardless of whether or not coherency has yet been obtained across the memory system. If a potential delay condition is encountered during store processing, the store request is rejected, allowing the requester to cancel all subsequent ordered stores in process from the same stream. New store data is not sent until resources for the prior store have been committed without encountering any potential delay conditions, thus ensuring stores occur in the correct order.

The flowchart and block diagrams in the Figures illustrate the architecture, functionality, and operation of possible implementations of systems, methods, devices, and computer program products according to various embodiments of the present invention. In this regard, each block in the flowchart or block diagrams may represent a module, segment, device, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions. In many embodiments, the functionality described herein is implemented fully or partially by special-purpose hardware, as hardware implementations typically offer superior speed for specialized operations and therefore may often be better suited to achieving high throughput for the data storage operations described herein.

A distributed shared memory system is a system where there is a single memory space, which can be spread over multiple physical locations, and all processors can access that shared memory space. Some distributed memory systems are used in combination with data communication sub-systems and/or techniques, such as PCIe (peripheral component interconnect express), that use parallel access data streams. A parallel access data stream is any one of multiple data streams coming from one or more physical and/or virtual channels that can be in process simultaneously, where each stream is made up of stores for which a proper sequence must be maintained ("ordered stores"). The descriptions herein are with respect to any one of these data streams.

Typically, distributed shared memory systems exhibit variable latency. Latency is the delay between a request for access to a memory location, and the granting of the access. An example of a variable latency system is a conventional mainframe system, which supports a fully coherent memory with a single memory address space. The memory address space may be shared by many processor cores spread across a non-trivial physical space, with multiple levels of caches supporting these cores. Servicing memory access requests must ensure that the correct data is accessed without conflict, regardless of the physical location(s) in the memory system where that address is currently being maintained.

Some embodiments of the present invention may include one, or more, of the following features, characteristics and/or advantages: (i) support for high data bandwidth PCIe traffic between I/O (input/output) ports and system memory; (ii) support for industry standard interfaces, such as x8 and x16 Gen-3 PCIe; (iii) support for communication interfaces that expect stores to appear in memory (to application programs) in the order sent; (iv) compatibility with industry standard PCIe devices; and/or (v) support for approximately 7 GB/s (Gigabyte/second) or greater of store data (the net data capacity of an 8× Gen-3 PCIe bus after subtracting command and control overhead on the 8 GB/s combined command and data interface), written to memory in order.

Some embodiments of the present invention recognize the following facts, potential problems and/or potential areas for improvement with respect to the current state of the art: (i) support for high data bandwidth PCIe traffic between I/O and system memory may be difficult to achieve in some systems due to complex system structure (for example, systems having a fully coherent memory with a single address space shared by up to 192 cores and memory spread across 8 nodes in 4 drawers, with multiple levels of shared and private data caches, sliced into independently operating units by address for parallelism and maximum system throughput, where data may be held in various shared or exclusive states in any of the caches, depending on prior system activity); (ii) in such systems, executing memory writes in order may be difficult, for example because access time may depend on the system state, and location and ownership of the address to be stored; (iii) I/O may be attached to the memory subsystem through an L3 (level 3) cache, having, for example, a 256 byte line size; (iv) if ordered stores are executed in serial fashion, wherein a second store cannot start until after a first store has fully completed, the store bandwidth can be significantly slower than desired and/or required by operating specifications; (v) alternatively, if multiple ordered stores are launched in parallel, without further interlocks, it cannot be guaranteed that the stores will complete in the correct order; (vi) implementing interlocks may be complicated by multiple independent slices and pipelines in the system; and/or (vii) using the moment coherency is obtained (rather than final completion of a store) as the time when the next ordered store can begin allows a faster rate of execution than fully serializing stores, but does not provide sufficient ordered write bandwidth to satisfy operating requirements in all cases of practical interest, such as with PCIe interfaces to complex distributed shared memory systems.

A fully coherent memory requires obtaining coherency on each line stored to guarantee memory consistency and coherency visible to all processors and I/O interfaces. Obtaining coherency requires: (i) querying one or more cache directories to locate the closest copy of data where the store can be performed while maintaining coherency (in other words, locating the primary copy of the data); (ii) obtaining exclusive ownership of the data for the I/O store; and (iii) reserving certain hardware resources necessary to complete the store. The time needed to obtain coherency depends on the state of local and other directories, and the system capacity. Some systems may represent small single-drawer configurations or larger multi-drawer configurations, with some systems having more caches and/or more interconnections to be searched than others.

Some embodiments of the present invention recognize: (i) that in some conventional systems, the time needed to obtain coherency may be around 60 ns (nanoseconds) in a single node system configuration and over 25% longer in a multi-node system configuration, while the time needed to fully complete a store is longer still; (ii) to meet the PCIe required net minimum of 7 GB/s, a new store (of a 256-byte line) must be launched every 36.6 ns or sooner; and/or (iii) if ordered stores are executed in serial fashion, wherein a second store cannot start until after a first store has fully completed, the store bandwidth will be significantly less than the 7 GB/s required.

In some embodiments of the present invention, once a store, directed to a target address, is initiated and obtains coherency, certain critical system resources such as command and data buffers are reserved and the target address is locked. When an address is locked, the old data therein cannot be read by any processor or I/O device. Once the target address has been locked, a subsequent ordered store can begin, and data will be stored in the correct order.

Some embodiments of the present invention recognize the following facts, potential problems and/or potential areas for improvement toward achieving sufficient ordered store bandwidth with respect to the current state of the art: (i) using the coherency point of a store as the time the next ordered store can begin allows a faster rate of execution than fully serializing stores, but doesn't provide sufficient ordered write bandwidth to satisfy the PCIe requirement; (ii) launching speculative stores at a predetermined rate regardless of the progress of the prior ordered store, monitoring the order in which coherency is obtained, and canceling and restarting stores that obtain coherency out of order may be unacceptably complex; and/or (iii) preloading the next store in a cache, such as a level 3 (L3) cache (in a platform register), and holding the preloaded store for execution until the prior store obtains coherency is possible, but because caches may be sliced by address, this may require complex cross-communication between independent cache slices and is thus not desirable. Slicing by address means that caches are sometimes split on certain address bits to allow processing of more operations in parallel. Because caches tend to process via pipeline (meaning operations are processed serially), having multiple pipelines (here, slices) means more commands can be processed in parallel.

Some embodiments of the present invention recognize that: (i) an I/O controller may be, for example a PCIe bridge unit (PBU) which includes a PCIe bridge controller (PBC) and a PCIe root complex as internal sub-units; (ii) the last point where stores remain in a single stream, and therefore where coordination between successive ordered stores is convenient, is in the I/O controller; and/or (iii) it is therefore desirable to control order from the I/O controller.

Some embodiments of the present invention allow a second store to begin before full coherency of the first store is obtained. L4 caches and fabric across the system are treated as a pipelined resource, wherein a command begins at a local L3, then proceeds to the local L4, then across the system fabric to other L4 and L3 caches, each L3 possibly (depending on its directory contents) also searching the level 2 (L2), and possibly level 1 (L1) caches on one or more of its attached processors.

By pipelined resource, it is meant that there are separate processing steps at each unit the store passes through. As processing moves on to the next stage, the preceding stage is free to work on the next instruction, so that across the system, there may be multiple instructions in process at the same time, with each at a different location and a different stage of completion. It may help the reader to visualize an assembly line, where item A has component X added at station 1, then, when item A moves on to station 2 to have component Y added, item B is at station 1 getting component X added, and so on. In the context of the present disclosure, there may also be multiple pipelines simultaneously working on different storage streams. These pipelines may be processing through the same physical structures at the same time, as long as there are sufficient resources in those structures to support the operations of each pipeline. For example, the same physical L3 or L4 "structure" may contain separate physical components per pipe or slice for most of the stages of each pipeline, although some of the interconnections from one stage to the next (such as the bus connection between L3 and L4) may be shared between pipes and slices.

In some embodiments, caches are divided into slices, and some control is required for maintaining order across independently operating slices. For example, there may be one slice to handle all the even addresses and another slice to handle all the odd addresses. Each slice may be a separate set of hardware having all the parts required to complete all the processing steps for a memory operation. Having multiple slices allows more throughput, since each slice can contain its own independent set of instructions in process, with different instructions processing in the other slice(s) simultaneously.

Obtaining system-wide coherency requires searching all affected caches. In a case where the I/O store will miss in cache, and go to memory, this searching includes the local L3 cache, and L4 cache on all nodes. Obtaining a response from the furthest L4 cache generally determines the coherency time.

In some embodiments of the present invention: (i) the target address for a first store is locked; (ii) resources, including command and data buffers, are reserved, for the first store, in the local L3 only (closest stage in the fabric "pipeline"); and/or (iii) the command is forwarded to the attached L4 for further coherency checking related to the first store. Further, after completion of items (i), (ii) and (iii) above for the first store, the PBC is then allowed to send a second store to L3. Once L3 has obtained local store resources for the second store, and locked the target address locally, coherency checking proceeds across the system fabric buses to L4 on the local and remote nodes. L4 implements additional features to keep the stores in order on the fabric.

Some embodiments of the present invention assume that once a target address for a store is locked in the local L3, and the coherency broadcast to the nearest L4 begins, the rest of the cache coherency checking pipeline (through remote L4 caches) will proceed in order with essentially fixed timing, and will encounter no conflicts. Thus the store remains in order, with respect to other ordered stores that may subsequently launch onto the fabric, without direct interlocks between the stores. The PBC has visibility to the complete ordered store command stream since it is not sliced, and launches each of the stores into its address-appropriate slice. In the event of a conflict in any of the L4s, the store is rejected back to the PBC to be restarted, thus preventing a first store from falling behind a subsequent store. In the event of such a reject, the PBC identifies and cancels all subsequent stores in the stream that have been launched into L3, even if they have been launched into different slices. The entire ordered stream is started again maintaining the correct order.

In some embodiments of the present invention, cancelations and restarts are sufficiently infrequent that ordered store bandwidth when using the above approach meets relevant PCIe specifications. In cases where no conflicts or rejects occur at any of the L4s, several ordered stores may be in progress simultaneously on the system fabric, completing in the correct order.

An embodiment of a possible hardware and software environment for software and/or methods according to the present invention will now be described in detail with reference to the Figures. FIG. 1 is a functional block diagram illustrating various subsystems of supercomputer 100, including: nodes 101a through 101n (collectively nodes 101); internode communication fabric 108; PCIe switching fabric 112; non-volatile storage 106; PCIe compliant device 118; and PCIe I/O adapters 116.

Internode communication fabric 108 facilitates communication among nodes 101. PCIe switching fabric 112 enables communication between I/O adapters 116 and nodes 101. In various alternative embodiments each node 101 may or may not be operationally coupled with non-volatile storage 106, and each node 101 may or may not be operationally coupled with PCIe switching fabric 112. PCIe compliant device 118 communicates with nodes 101 through one of I/O adapters 116 and PCIe switching fabric 112.

Internode communication fabric 108 provides communications between various components of supercomputer 100, and in particular, between the various nodes 101. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Non-volatile storage 106 is computer-readable storage media. In general, non-volatile storage 106 can include any suitable non-volatile computer-readable storage media. It is further noted that, now and/or in the future: (i) external device(s) may be able to supply, some or all, memory for non-volatile storage 106; and/or (ii) devices external to supercomputer 100 may be able to provide memory for non-volatile storage 106.

Figure 2:
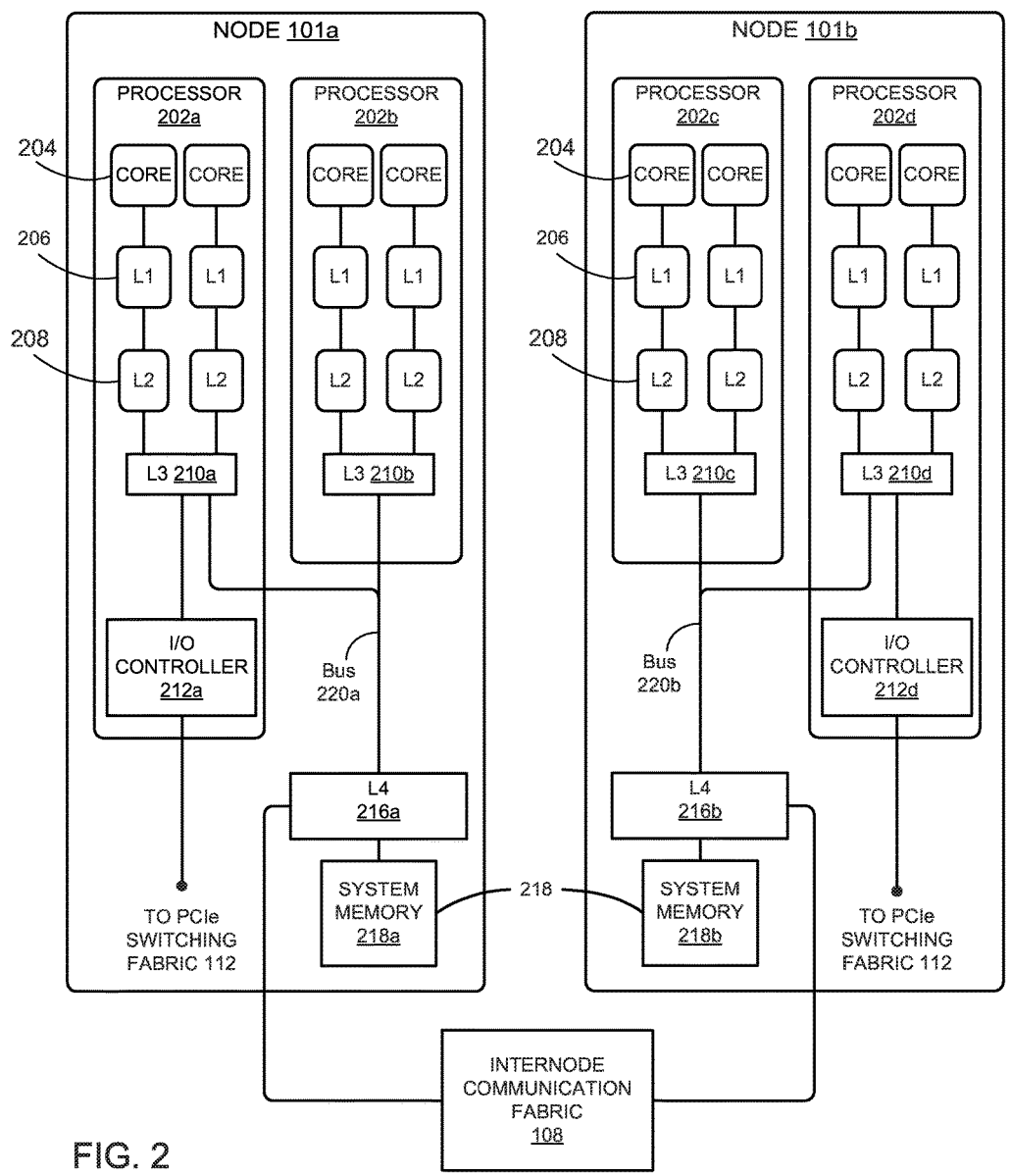
FIG. 2 is a block diagram of a portion of the first embodiment system.

FIG. 2 is a functional block diagram illustrating various subsystems of nodes 101, and internode communication fabric 108, including processors 202a through 202d (collectively processors 202), where each processor 202 includes one or more of cores 204, L1 (level 1 caches) 206, L2 (level 2 caches) 208, and L3 (level 3 caches) 210a through 210d (collectively L3 210). Nodes 101 further include: bus 220a and bus 220b (with respect to node 101a, bus 220a is a local bus and bus 220b is a remote bus, whereas with respect to node 101b, bus 220b is a local bus and bus 220a is a remote bus); I/O controllers 212a and 212d (collectively I/O controllers 212); L4 (level 4 caches) 216a and 216b (collectively L4 216); and system memory 218a and 218b (collectively system memory 218). In this embodiment, I/O controllers 212 are PCIe bridge units (PBUs) each of which includes a PCIe bridge controller (PBC). Each L3 and each L4 is associated with at least one controller (not shown), which is a set of registers and associated logic making up a finite state machine that controls and tracks the progress of a command processing through that cache. Communications among nodes 101 is facilitated by internode communication fabric 108.

It is noted here that the architecture illustrated in the embodiment of FIG. 2 is not limiting. There are numerous alternative embodiments that do not depart from the spirit of the present invention. For example, some embodiments have any number of nodes 101, and a node can have any number of processors 202. Some processors 202 may have no L3 210 while others may have one or more. Similarly, processors 202 may have any number of cores 204. Cores may have L1 206 and L2 208 caches, of various sizes and configurations. Other embodiments are configured with any number of I/O controllers 212a, each of which may be a PCIe I/O controller, a non-PCIe I/O controller, or an I/O controller capable of handling both PCIe and non-PCIe communications. Each L3 210 may or may not be coupled with an I/O controller 212, and alternatively, each I/O controller 212 may be coupled with one or more L3 210, and/or may be coupled directly to a different cache/memory level.

System memory 218 is configured as a single memory address space notwithstanding that the physical devices comprising system memory 218 may be numerous, distributed and/or non-homogeneous. In some embodiments, L4 caches may be interposed between system memory and lower-level caches. In some embodiments, the physical devices comprising system memory are configured as a RAID (redundant array of independent disks)-style memory system. Multiple storage controllers (not pictured) may be present on any or all given nodes 101, and a unitary L4 216 may be split between or among them. A single I/O controller 212 may be connected to several "copies" of L3 and/or several copies of L4, where the copies may be selected (sliced) by address as discussed previously, with each copy independently following the processing steps discussed below with minimal connection to the other copies due to the distance between them (for instance, one slice may be built on the left side of a chip, while another slice may be built on the right side of the chip; much communication between the slices on command progress is not practical due to the physical distance between them).

In some alternative embodiments: (i) the physical structure differs from the logical structure to accommodate physical package limitations; (ii) the storage hierarchy is L1-L2-L3-L4-system memory-non-volatile storage, but the memory controller is physically connected to L3, and the non-volatile storage is also connected to L3, via an I/O controller; (iii) L4 is connected to each processor via separate point-to-point connections; (iv) there's a separate storage controller inside each processor chip attached to the L3 in that processor chip, and a separate system memory block attached to each storage controller (the memory is in the node but outside the processor chip); (v) the I/O controller may be inside or outside each processor chip; (vi) each node contains 3 processor chips, and each processor chip contains 8 cores, 8 L1, 8 L2, 1 L3, 2 PCIe I/O controllers, and 1 storage controller; (vii) L4 is in a separate system controller chip, for which there is one per node; (viii) the system memory is made up of separate components (for example, 5 memory DIMMs per processor chip and memory controller) within each node; and/or (ix) there may be up to 8 nodes, packaged in up to 4 drawers.

While various architectures and embodiments are contemplated above, they are neither exhaustive nor limiting upon possible other architectures and embodiments of the present invention, which will be readily recognized by one of ordinary skill in the art.

In some embodiments of the present invention, distributed shared caches (for example, L2 208, L3 210, and/or L4 216, with one or more instances of each cache distributed across the system and sharing the same address space) allow multiple copies of data to exist in more than one place. When multiple copies of a piece of data exist in a distributed shared cache, one copy, designated IM ("intervention master"), is returned in response to requests for the data requested by a processor 202 or another cache. The cache lines that are not designated IM do not provide a copy. This prevents multiple copies of the data from being returned to the requestor.

In some embodiments, the IM state is associated with a particular line in the cache. The IM state identifies the cache that most recently obtained the data. If the line is requested by a cache that does not already have that line, the previous IM transfers the data to the requesting cache, and the requesting cache might be designated the new IM for that line, in which case the cache that previously had IM status will relinquish IM status, but may still retain a copy of the data.

Figure 3:
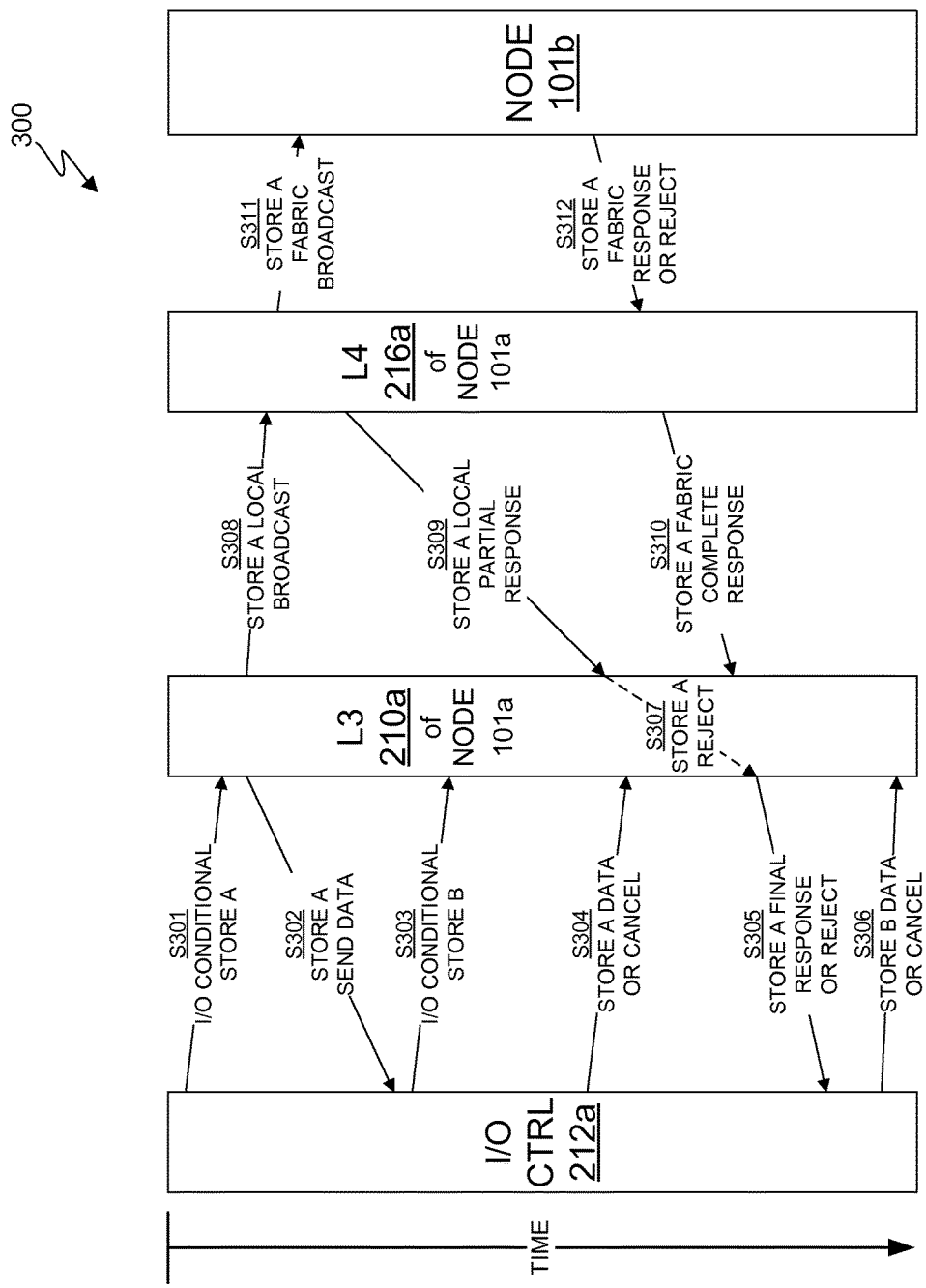
FIG. 3 is a sequence diagram for an example scenario involving the first embodiment system.

FIG. 3 is a sequence diagram for example scenarios involving the first embodiment system. To perform a store operation, I/O controller 212a sends a first IOCS (I/O conditional store) request to L3 210a in step S301. If the request hits exclusive to L3 210a, meaning that the line of interest currently exists in that L3 and is in a state where a process can store to the line without checking the rest of the system (because that L3 has gotten coherency to write to this line and no other copies exist in the system), the operation has established coherency immediately and will not need to broadcast onto the system fabric in order to process the store and have the next store start up (discussed below). In this case, L3 210*a* responds to the first IOCS request by sending a signal to I/O controller 212*a* indicating the L3 is ready to receive the data after (i) obtaining coherency on L3 210*a* (making sure no other operations are working on that address space in that L3 by checking addresses of active processes that have established coherency prior to this store coming to this L3); and (ii) allocating store controller and buffer resources, also known as LSAR (line store address register and associated state machine, not shown).

If the line does not hit exclusive to L3 210*a*, L3 responds to the first IOCS request by sending a signal to I/O controller 212*a* indicating L3 210*a* is ready to receive the data only after: (i) obtaining coherency on local L3 210*a*; (ii) allocating store controller and buffer; and (iii) making sure resources are available, on all neighboring processor 202 and storage controller 214 chips, to send an initial broadcast.

In this embodiment, each local chip (for example, processor 202*a* chip, and system controller chip, not pictured, which includes L4 216*a*) keeps track of the outstanding commands it has issued to the directly attached L4 216*a* and L3s (210*a* and 210*b*) within those chips, to determine whether those local chips have the capacity to accept another command, or if alternatively all processing resources are already in use. There is a predefined queue depth dedicated to the sender at each L3 210 and L4 216. Broadcast S308 is sent only if: (a) L3 210*a* knows local L3 210*b* and L4 216*a* are ready to accept a new command; and (b) the line is not already held exclusively by the local L3 210*a* (in which case a broadcast would be unnecessary).

Both the ability to send the local broadcast S308 and address coherency on the local node are established before I/O controller 212*a* is notified to send data (step S302). This is done in parallel when store controller resources are allocated. The initial broadcast S308, and send data response S302, are sent upon the load of LSAR. However, if the required resources are not available on neighboring chips when the command is ready to load into LSAR, the command is held back and is not yet loaded into the LSAR, broadcast S308 is not yet sent out, and the I/O controller is not yet notified to send data. All of these actions are delayed until processing resources become available in the neighboring chips to accept the broadcast S308, if the local cache directory state indicates a broadcast is needed. Therefore, in the case where a line does not hit exclusive to L3 210*a*, all of (i), (ii), and (iii) above occur before an initial broadcast is sent out across the local fabric.

Once L3 210*a* sends the 'send data' message for the first IOCS request (S302), L3 is ready to: (i) receive data for the first store in step S304; and/or (ii) receive a second IOCS request in step S303. (Note that once L3 has indicated it is ready to receive data for a first store, step S302, I/O controller 212*a* can send a second IOCS request, step S303. L3 210*a* however cannot reserve and/or use the broadcast resources for a second store before the resources are reserved for the first store—if the second store were allowed to reserve and/or use the broadcast resources before the first store did, a deadlock would result.) In FIG. 3, step S303 occurs prior to step S304, but these steps could occur in either order.

Once the local coherency broadcast is sent (here as a cross-bus, or XBUS, broadcast on bus 220 of node 101*a*), in step S308, the attached processor 202 chips of local node 101*a* snoop their L3 210 directories to determine if they have the primary (IM) copy or a shared copy of the line (assuming a single L3 per chip). The directory results are reported back to the requesting chip via a PRESP (partial response) in step S309. Attached processor 202 chips with a shared copy of the line will invalidate their copy of the line. An attached processor 202 chip holding the primary copy, or an attached processor 202 chip that is connected to the target memory, will wait for the requesting chip to send the data.

During the same coherency broadcast, L4 receives the IOCS request (still step S308) and performs a snoop of the local L4 directory as well as an address compare against all other on-chip controllers, if any. If the broadcast result from any local caches is a reject: (i) L3 210*a* receives a reject notification in step S309; and (ii) L3 sends a reject response to I/O controller 212*a* in steps S307 and S305, to indicate that the command was not successful. I/O controller 212*a* will then identify any following stores of the data stream that have been initiated and issue a cancel command to L3 210*a*, in step S306 to cancel those stores.

The IOCS is rejected back to L3 210*a* if: (i) there are any other controllers processing the same line; or (ii) (a) the directory state (such as a directory miss, or there is another copy of the line on a remote node) indicates a global fabric broadcast over internode communication fabric 108 is required and (b) there are insufficient L4 resources available to initiate a global fabric broadcast. If neither (i) nor (ii) above is true, the IOCS is accepted into L4 216*a*.

If the IOCS is accepted into L4 216*a*, the operation is broadcast on the global fabric, in step S311, to determine where the final destination will be, except in a case where the IOCS can complete in L3 210*a*, or in another L3 210 cache on the local node 101 (that is, the target line hits on the local node as the IM (intervention master) and the directory state indicates that there are no shared copies of the line on any remote nodes 101).

The coherency broadcast on the global fabric in step S311 is sent to all nodes in the system to snoop their directories and determine where the IOCS will ultimately be completed. If there are any storage controllers 214 on any nodes 101 currently processing the line for another operation, the IOCS will terminate processing and return a final reject response (step S312) to the requesting processor 202 chip. If the IOCS is not rejected on the global fabric: (i) a non-reject fabric response is issued to L4 216*a* in step S312; and/or (ii) processing at the L4 216*a* proceeds in a fashion identical to a demand store (unconditional I/O operation). After local coherency checking is complete in L4 216*a* and L4 216*a* has received a fabric response from Node 101*b* (step S312), a complete response is issued to L3 210*a* in step S310.

A miss response (MRESP) and a hit response (HRESP) are responses of the status of a line in the system. An MRESP indicates the line will be sent out to system memory. An MRESP is returned to the requesting processor chip (CP) 202 if there is no IM copy of the line in any cache, indicating that the IOCS will be completed in memory as opposed to cache. An MRESP is sent to the requesting CP chip regardless of whether the target memory location is on a remote node or the local node. An HRESP means that the line will be stored somewhere in the cache hierarchy. An HRESP is returned to the requesting CP processor 202 chip if the line hits IM on a remote node, indicating that the IOCS will be completed in the cache on the remote node 101 where the hit occurred.

If the broadcast result is a reject, L3 will send back a reject indication to the PBC 212*a*, in step S305, indicating that the IOCS request is denied, and that I/O controller 212*a* needs to roll back any other affected stores it might have initiated.

An affected store is a store belonging to the same data stream as the rejected store and that was initiated after initiation of the rejected store.

Once L4 indicates that it has established coherency for the primary (IM) line, LSAR can then proceed with the store. If applicable, LSAR will request cores 204 to relinquish ownership of the shared line and make sure that the adjacent processor 202 chips that do not have the primary (IM) copy (or target memory) have successfully taken away their cores' ownership and invalidated their shared copies. Once the local node 101a has invalidated any local non-primary copies of the line, the new data that was received from the I/O controller 212a can be sent out to the primary copy (L3 210a in local processor 202a, local L4 216a or remote L4 216b, or L3 210b, 210c or 210d in remote processor 202b, 202c, or 202d via L4 216a, and also via 216b in the case of storing to processor 202c or 202d). I/O controller 212a has the right to send an indication that the store is canceled, instead of sending new data. L3 will honor that cancelation and indicate to the location of the primary copy that the operation has been canceled.

Once the data is sent and the store is executed, the store operation is complete and: (i) the resources are returned back to a general use pool; (ii) L3 returns a final response to the I/O controller 212a, to indicate a successful store; and/or (iii) I/O controller 212a can send data associated with the next IOCS request that I/O controller 212a has already initiated.

Figure 4:
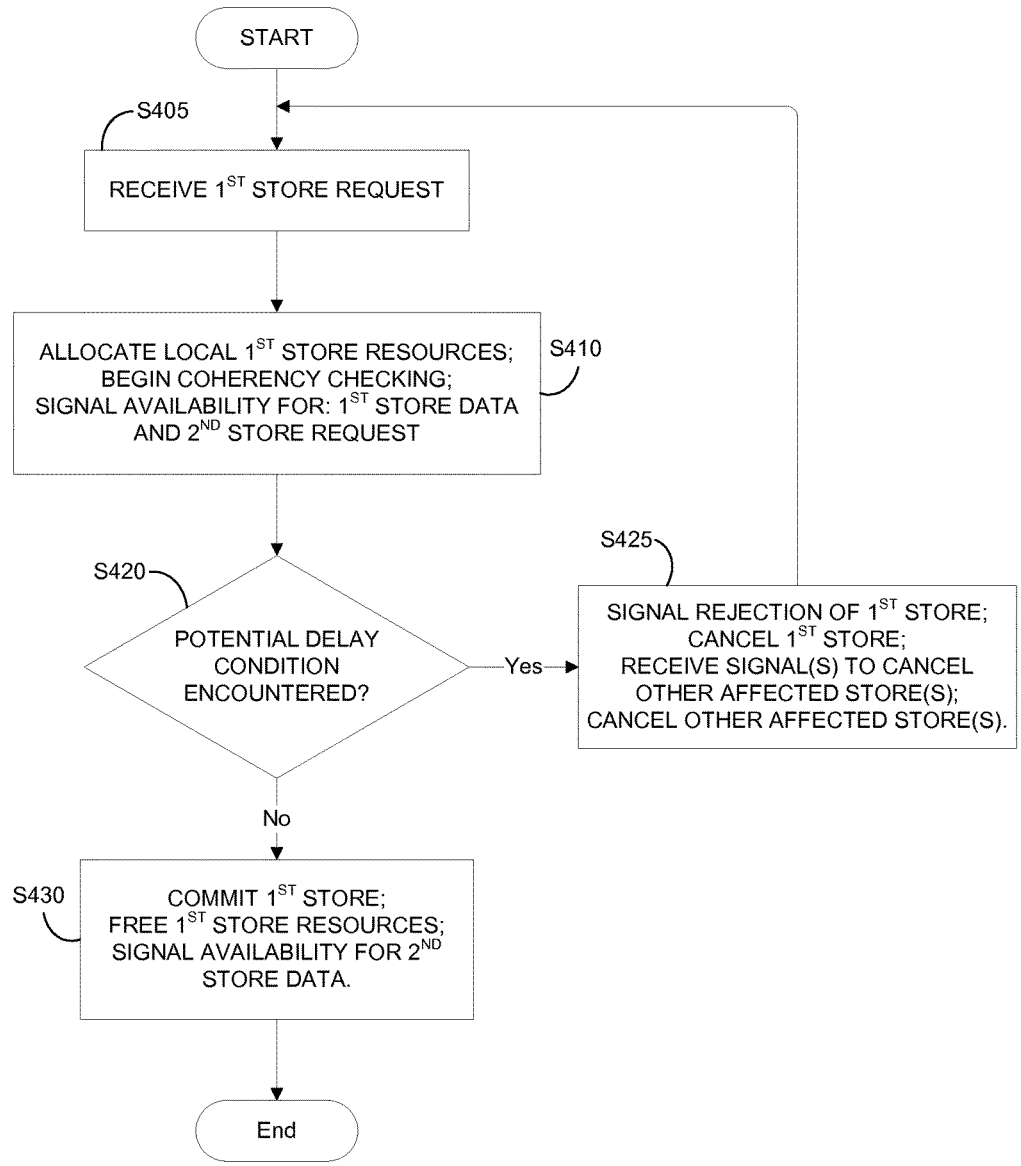
FIG. 4 is a high-level flowchart representing at least some operations performed by a second embodiment system according to the present invention.

Shown in FIG. 4 is a high-level flowchart representing at least some operations performed by a second embodiment system according to the present invention. For the sake of convenience, this second embodiment system shares the same architecture as the first embodiment system. As such, the preceding Figures may also be referred to throughout this discussion.

Processing begins with S405, where L3 210a receives a first IOCS (I/O conditional store) request, for a first store, from I/O controller 212a. This is similar to step S301 of the embodiment of FIG. 3. Note: Where references are made to a first store or a second store, the first store and the second store are from the same data stream. In some embodiments, a data stream is a series of data packets from the same originator. An originator may be, for example, an I/O adapter such as one of I/O 116 of FIG. 1. As an alternative example, an originator may be a virtual I/O adapter. In some embodiments, a data packet is identified by a five-bit NID (node identifier) encoded within the data packet such that data packets originating from the same originator are guaranteed to have the same NID and therefore are identifiable as being members of the same data stream. Multiple data streams may be processed by each I/O controller 212, in any order, and no ordering requirement exists for stores of one data stream relative to stores from another data stream. However, stores from any single data stream (that is, stores having the same NID) are required to be accomplished in the correct order to preserve the integrity of the data stream. The correct order is determined by the order in which the data packets arrive at an I/O controller 212. Stores for each NID are considered a data stream of related stores that are to be processed in order with respect to each other. Stores from different NIDs are considered independent data streams that may be processed independently (that is, at the same time, in parallel), and are one example of "parallel access data streams."

In this embodiment, the I/O controller accepts PCIe-type communications and is a physical controller. In alternative embodiments, the request may come from a different type of physical input controller, the input controller may be a virtual controller, and/or the request may be received into a different component of the memory node, such as an L4 cache or a memory controller chip without a cache.

Processing proceeds to S410, where, in response to receiving the first IOCS request, L3 210a: (i) allocates local resources in preparation for processing the first store; (ii) launches a coherency checking process; (iii) signals availability to accept the first store data and (iv) signals availability to accept a second IOCS request for a second store. Note that, in some embodiments, these signals may be combined—for example, the signal for availability to accept a second IOCS request may be implicit in the signal for accepting the first store data.

L3 210a signals availability to accept the first store data, item (iii) above, after reserving all necessary local resources for the first store, and L3 (or alternatively, whatever memory subsystem has received the store request) has successfully launched the coherency checking process.

By signaling availability to accept a second IOCS request before the first store has been committed, item (iv) above, and even before coherency has been established for the first store, this embodiment of the present invention sufficiently compresses the time interval between successive stores of a data stream such that it is compliant with relevant PCIe bandwidth standards.

The coherency checking process launched in S410 treats all L4 216 caches and fabric, across the system, as a pipelined resource, wherein a command is received by a local L3 (such as L3 210a), proceeds to other local L3s (210b) and the local L4 (216a), then across the system fabric to one or more remote L4s (216b) and associated L3s (210c through 210d). Each L3 (210a through 210d), depending on its directory contents, may also search its local L2 208 and L1 206 caches on one or more of its attached processors.

Some embodiments of the present invention assume that once a target address for a store is locked in the local L3, and the coherency broadcast to the nearest L4 begins, the remainder of the cache coherency checking pipeline (through remote L4 caches) will proceed in order with essentially fixed timing, and will encounter no potential delay conditions. Thus the variable latency memory system appears as essentially a fixed latency system, thereby enabling embodiments to launch multiple stores with a high degree of parallelism, at high bandwidth, while maintaining the proper ordering of the stores without direct interlocks between the stores. Further, embodiments can recover from disruptions in the memory system latency while still maintaining proper store ordering by canceling all store requests in a stream that follow any store request that encounters a potential delay condition.

In some embodiments, the pipeline will be slightly different to accommodate a different architecture. For instance, if there is no L4 and only a single L3 on the originating node, the pipeline would proceed from the local L3 (which would take the place of L4 as the fabric gateway) directly across the system fabric to the receiving memory subsystem on another node (whether L3, L4, a memory controller with no cache, and so on).

Processing proceeds with decision S420, where, during the coherency checking process, a potential delay condition may be encountered. These potential delay conditions include: (i) another controller (that is, a set of registers and associated logic making up a finite state machine that controls and tracks the progress of a command) processing the same line (for example, the line is locked because a command being processed by another controller, whether on the local node or a remote node, involves the same memory address or a memory address that is part of the same 256-byte cache line); and/or (ii) the directory state (such as a directory miss, or an indication that there is another copy of the line on a remote node) indicates a global fabric broadcast is required and there are insufficient L4 resources (that is, a controller on the local node and a controller on each of the remote nodes) available to initiate a global fabric broadcast. Note that these conditions are not necessarily due to a cache coherency conflict, but rather are concerned with the more general ability of the system to process the request in a timely fashion.

Concurrently, or in sufficiently close temporal proximity with the coherency checking process, L3 210a, having signaled availability to accept data for the first store, can receive that data before committing to complete the first store.

If a delay condition is encountered for the first store (S420, "Yes" branch) by a system component at any stage of the pipeline (such as the originating L3 cache subsystem, a different local L3 or the L4 fabric gateway, a memory controller from a remote node, and so forth), processing proceeds to step S425, where L3 210a: (i) signals a rejection of the first IOCS request; (ii) cancels operations associated with the first store; and/or (iii) releases any resources that have been reserved for the first store. As a consequence, L3 210a may also receive one or more signals from I/O controller 212a, each signal to cancel a store subsequent to the first store that is part of the same data stream as the first store. If L3 210a receives one or more cancelation requests, L3 210a (i) cancels activities associated with the corresponding I/O conditional store requests; and (ii) sends to I/O controller 212a, a "cancelation complete" signal for each cancelation that is processed. Alternatively, no "cancelation complete" signal is sent, and/or the system temporarily holds or continues to try to obtain resources for the one or more canceled stores in anticipation of a reissue of the rejected store request(s) by the requester. If the rejected store request(s) are reissued by I/O controller 212a, processing returns to step S405, where the request(s) are re-attempted following the same process herein described. In some embodiments of the present invention, the I/O controller may reissue the same stores in a slower rate mode that does not require rejection due to processing delay. This approach avoids repeatedly canceling the same set of multiple stores should the first store of the stream again encounter a delay.

If a delay condition is not encountered for the first store (decision S420, "No" branch), processing proceeds to S430 where L3 210 (i) commits to completing the first store; (ii) frees resources reserved for the first store; and (iii) signals availability for the second store data.

Though not repeated or illustrated in FIG. 4, nor in the description thereof, with regard to references to the second IOCS request, it is to be understood that the procedures and tasks undertaken to handle the first IOCS, are also undertaken to handle the second IOCS request, and other IOCS requests.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Some embodiments of the present invention may include one, or more, of the following features, characteristics and/or advantages: (i) pertain to external devices, and specifically to DMA writes by external devices; (ii) include external devices that operate without a cache dedicated to external devices (they access memory directly, or may utilize the L3 and L4 caches, which are shared by the processors); (iii) maintain full ordering on a network that is not fully ordered, by requiring fixed timing on the network, and rejecting and retrying any request that does not meet the fixed timing requirement, and also rejecting and retrying any following ordered requests, to maintain the correct order; (iv) handle ordering of requests to different locations (more difficult than the same location, since different fabric paths may be involved for different locations, but requests to the same location can be more easily ordered since they use the same fabric path); and/or (v) improve performance of ordered stores, not simply keep them ordered.

Some embodiments of the present invention may further include one, or more, of the following features, characteristics and/or advantages: (i) can send full line stores directly to memory that is capable of storing full lines; (ii) do not require fetching of lines to cache to facilitate storing more quickly; (iii) improve store performance when stores are sent to memory and no caching is required; and/or (iv) keep stores in order while maintaining high throughput; different ordered requests may proceed on different virtual channels (different pipes and slices), with order maintained by requiring fixed timing, and a system to reject and restart any request, and all following ordered requests including those in other channels, that cannot meet this timing requirement (this keeps requests ordered even when issued on different virtual channels).

Some embodiments of the present invention may still further include one, or more, of the following features, characteristics and/or advantages: (i) handle non-posted store requests (also known as non-posted writes, these are store requests that each return a final response, so, for example, the sender can participate in monitoring order and pacing of new commands), and cause them to be retried; (ii) retry multiple ordered requests, for the purpose of maintaining correct ordering, while using instruction overlap for improved performance; (iii) issue successive ordered write transactions before previous write transactions have completed, to improve performance; (iv) reject and retry a delayed store and the following stores; (v) do not require the sender to wait for the final response and use it to maintain order by launching the next ordered write when the previous one is confirmed to be complete; and/or (vi) accept multiple concurrent non-posted writes, maintaining interlocks between ordered writes to preserve order by canceling any ordered writes begun subsequent to one that does not complete.

Some embodiments of the present invention may yet further include the following features, characteristics and/or advantages: make use of independent slices and pipes (also referred to as (i) multiple independent paths; (ii) include multiple I/O transaction processing units; and/or (iii) include multiple virtual channels. Any of the independent paths is capable of rejecting and requesting a retry (based at least in part on the ability to respond in a timely manner, not necessarily on the cache state).

Response in a timely manner might be prevented by conflicts with other transactions in process. This could include things other than the cache state, such as, for example, bus busy, control registers or command queues full causing the command to stall waiting for processing resources, or concurrent processing of another transaction to the same or a related address that would cause the command to stall waiting its turn to proceed (to ensure cache coherency, some systems may recognize and serialize certain memory read and write combinations to related addresses to ensure multiple updates are accumulated and none are displaced, and/or that read requests do not obtain outdated data). In some embodiments of the present invention, coherency checking broadcasts are placed in a queue if resources are available, so busy fabric or pipes are not cause for a reject.

The I/O transaction sending unit (the PBC/PBU in some embodiments of the present invention) is responsible to identify, cancel, and/or retry all following stores. Responsibility to cancel and retry a rejected store may be distributed between the I/O transaction processing unit (of which there are several, one per virtual channel or slice and pipe) and the I/O transaction sending unit (of which there is one, per I/O bus stream, located in the PBC/PBU).

Some embodiments of the present invention may yet still further include one, or more, of the following features, characteristics and/or advantages: (i) have reasons for rejecting and retrying a store that include a delay in processing in the L4 cache and fabric, not necessarily directly due to cache coherency conflict; (ii) issue multiple ordered commands to memory, in parallel, with an in-flight ordering mechanism on the path to memory; and/or (iii) allow for overlapped writes at a faster rate than serialized writes.

Some helpful definitions now follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Memory node: a segment of a distributed shared memory system responsible for managing a particular portion of the memory of the distributed shared memory system; may include a portion of system memory, one or more caches at one or more cache levels, and/or one or more controllers for mediating access to memory and cache components.

Cache instance, cache level instance: with respect to a single memory node, a particular cache unit or cache unit at a particular level; for example, a node may have two L1 caches and one L2 cache, each of which is a cache instance and two of which are L1 cache instances; each cache instance may also include or otherwise be associated with one or more controllers.

What is claimed is:

1. A method comprising:
receiving from an input/output controller (an I/O controller), and by a local node, a request to store a first dataset;
sending, from the local node, and to a local processor, a coherency broadcast with respect to the request to store the first dataset;
sending, from the local node, and to the I/O controller, a send data signal indicating that:
with respect to the first dataset, coherency of a cache line in a first cache level of the local node has been obtained,
the local node is ready to receive the first dataset, and
the local node is ready to receive a request to store a second dataset before completion of the request to store the first dataset.

2. The method of claim 1, further comprising:
receiving the first dataset from the I/O controller;
receiving the request to store the second dataset;
receiving a delay signal indicating that completion of the request to store the first dataset is delayed; and
in response to receiving the delay signal indicating that completion of the request to store the first dataset is delayed, cancelling the request to store the second dataset.

3. The method of claim 1, further comprising:
obtaining full coherency with respect to the first dataset;
in response to obtaining full coherency with respect to the first dataset:
completing the request to store the first dataset, and
signaling, by the local node, and to the I/O controller, readiness to receive the second dataset.

4. The method of claim 1, wherein:
the first cache level is a level 3 cache, associated with the local node; and
the cache line is a destination of the first dataset.

5. A computer program product comprising a non-transitory computer readable storage medium having stored thereon program instructions to perform:
receiving, from an input/output controller (an I/O controller), and by a local node, a request to store a first dataset;
sending, from the local node, and to a local processor, a coherency, broadcast with respect to the request to store the first dataset;
sending, from the local node, and to the I/O controller, a send data signal indicating that:

with respect to the first dataset, coherency of a cache line in a first cache level of the local node has been obtained, the local node is ready to receive the first dataset, and the local node is ready to receive a request to store a second dataset before completion of the request to store the first dataset.

6. The computer program product of claim 5, further comprising program instructions to perform:

receiving the first dataset from the I/O controller;

receiving the request to store the second dataset;

receiving a delay signal indicating that completion of the request to store the first dataset is delayed; and in response to receiving the delay signal indicating that completion of the request to store the first dataset is delayed, cancelling the request to store the second dataset.

7. The computer program product of claim 5, further comprising program instructions to perform:

obtaining full coherency with respect to the first dataset;

in response to obtaining full coherency with respect to the first dataset:

completing the request to store the first dataset, and signaling, by the local node, and to the I/O controller, readiness to receive the second dataset.

8. The computer program product of claim 5, wherein:

the first cache level is a level 3 cache, associated with the local node; and the cache line is a destination of the first dataset.

9. A computer system comprising:

at least one processor; and a non-transitory computer readable storage medium;

wherein:

the at least one processor is structured, located, connected and/or programmed to run program instructions stored on the computer readable storage medium; and the program instructions include instructions to perform:

receiving, from an input/output controller (an I/O controller), and by a local node, a request to store a first dataset, sending, from the local node, and to a local processor, a coherency broadcast with respect to the request to store the first dataset, sending, from the local node and to the I/O controller, a send data signal indicating that:

with respect to the first dataset, coherency of a cache line in a first cache level of the local node has been obtained, the local node is ready to receive the first dataset, and the local node is ready to receive a request to store a second dataset before completion of the request to store the first dataset.

10. The computer system of claim 9, further comprising program instructions to perform:

receiving the first dataset from the I/O controller;

receiving the request to store the second dataset;

receiving a delay signal indicating that completion of the request to store the first dataset is delayed; and in response to receiving the delay signal indicating that completion of the request to store the first dataset is delayed, cancelling the request to store the second dataset.

11. The computer system of claim 9, further comprising instructions to perform:

obtaining full coherency with respect to the first dataset;

in response to obtaining full coherency with respect to the first dataset:

completing the request to store the first dataset, and signaling, by the local node, and to the I/O controller, readiness to receive the second dataset.

12. The computer system of claim 9, wherein:

the first cache level is a level 3 cache, associated with the local node; and the cache line is a destination of the first dataset.

* * * * *